United States Patent [19]

Muramatsu

[11] Patent Number: 5,732,288
[45] Date of Patent: Mar. 24, 1998

[54] AUTO-FOCUSING DEVICE FOR CAMERA

[75] Inventor: Masaru Muramatsu, Kawasaki, Japan

[73] Assignee: Nikon Corporation, Tokyo, Japan

[21] Appl. No.: 783,230

[22] Filed: Jan. 14, 1997

Related U.S. Application Data

[63] Continuation of Ser. No. 460,164, Jun. 2, 1995, abandoned.

[30] Foreign Application Priority Data

| Aug. 9, 1994 | [JP] | Japan | 6-187136 |
| Aug. 9, 1994 | [JP] | Japan | 6-187137 |

[51] Int. Cl.⁶ ............ G03B 17/00; G03B 3/10
[52] U.S. Cl. ............ 396/49; 396/95; 382/156
[58] Field of Search ............ 396/49, 95, 89; 395/900, 902; 382/156

[56] References Cited

U.S. PATENT DOCUMENTS

| 4,974,002 | 11/1990 | Ohnuki et al. | |
| 4,978,990 | 12/1990 | Yamasaki et al. | |
| 4,980,715 | 12/1990 | Utagawa | |
| 5,005,037 | 4/1991 | Akashi et al. | |
| 5,012,267 | 4/1991 | Higashihara | |
| 5,060,002 | 10/1991 | Ohnuki et al. | |
| 5,227,830 | 7/1993 | Yoshihara et al. | 354/402 |
| 5,239,332 | 8/1993 | Muramatsu et al. | 354/402 |
| 5,276,476 | 1/1994 | Uenaka | 354/400 |
| 5,291,235 | 3/1994 | Uenaka | 354/402 |
| 5,321,459 | 6/1994 | Uenaka | 354/400 |
| 5,359,382 | 10/1994 | Uenaka | 354/400 |
| 5,416,559 | 5/1995 | Uenaka | 354/402 |
| 5,457,513 | 10/1995 | Uenaka | 354/400 |

*Primary Examiner*—Safet Metjahic
*Assistant Examiner*—Eric Nelson
*Attorney, Agent, or Firm*—Oliff & Berridge

[57] ABSTRACT

An auto-focusing device for a camera according to the present invention comprises many different systems. Included is a focus detection section which intermittently calculates focus detection information corresponding to the distance to the photographic subject. Also included is a photographic subject position prediction section which predicts a future position of the photographic subject based on the focus detection information. Finally, a lens driving section then drives a photographic lens based on a predicted result of the photographic subject position predicting section. The photographic subject position predicting section includes a neural network that predicts the future position of the photographic subject with an input parameter that has values regarding focusing positions of the photographic lens. These values correspond to focus detection data calculated by the focus detection section. The neural network makes it possible to predict the future focusing position of the photographic lens accurately.

20 Claims, 13 Drawing Sheets

$$f(u) = \frac{2}{1+\exp(-u)} - 1$$

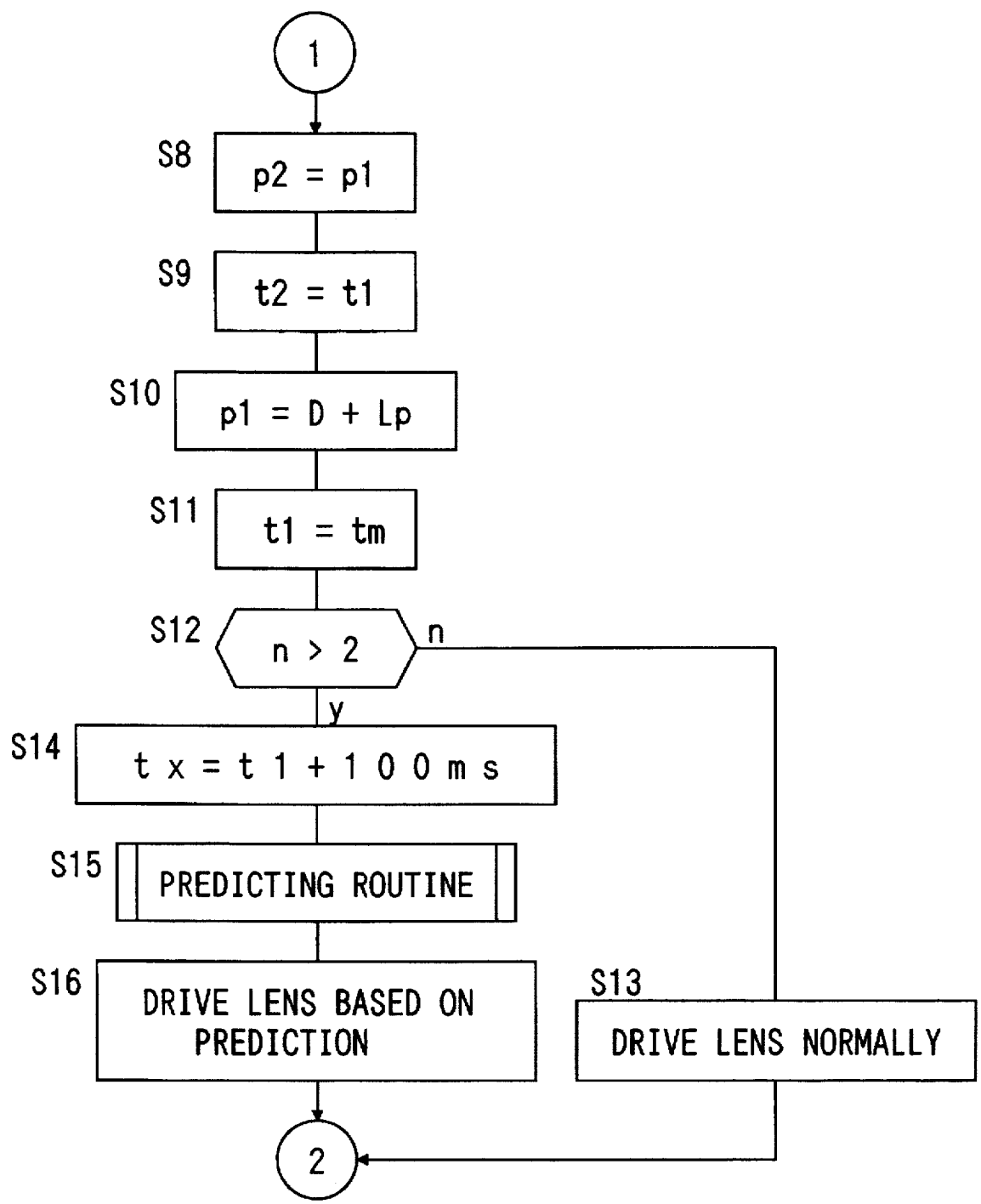

INPUT LAYER   INTERMEDIATE LAYER   OUTPUT LAYER

AUTO-FOCUSING DEVICE FOR CAMERA

This is a Continuation of Application Ser. No. 08/460,164 filed Jun. 2, 1995, now abandoned.

BACKGROUND OF THE INVENTION

1. Field of the Invention

The present invention relates to an auto-focusing device for a camera that predicts a future position of a photographic subject based on focus detection information corresponding to a distance to the photographic subject.

2. Description of the Prior Art

Since a photographic subject to be photographed is not always pausing, there is known an auto-focusing device that plural times calculates a position where a light flux from the photographic subject through a photographic lens forms an image, predicts a future position of the photographic subject based on two or more of the image formation positions, and drives a photographic lens based on the predicted position. For example, in case that the position of the photographic subject is predicted based on past two image formation positions, a movement of the photographic subject is approximated with a linear line. In case that the position of the photographic subject is predicted based on past three or more image formation positions, the movement of the photographic subject is approximated with a curve of second or more degree.

In case that this type of device is used, since a focus detection can be performed in consideration of a moving speed and a moving direction of the photographic subject even if the photographic subject has moved during the focus detection, an image blur can be effectively prevented.

However, the movement of the photographic subject is not always fixed. The moving direction and the moving speed of the photographic subject completely vary according to time and circumstances. Kinds of photographic subject to be photographed also vary according to photographers. Consequently, the position of the photographic subject can not be predicted accurately by only using past image formation positions.

SUMMARY OF THE INVENTION

The object of the present invention is to provide an auto-focusing device for a camera that predicts a future focusing position of a photographic lens accurately by using a neural network.

In order to attain this object, an auto-focusing device for a camera according to the present invention, comprises: a focus detection means for intermittently calculating focus detection information corresponding to a distance to a photographic subject; a photographic subject position predicting means for predicting a future position of the photographic subject based on the focus detection information; and a lens driving means for driving a photographic lens based on a predicted result of the photographic subject position predicting means. The photographic subject position predicting means includes a neural network that predicts the future position of the photographic subject with an input parameter that has values regarding focusing positions of the photographic lens corresponding to a plurality of pieces of the focus detection information calculated by the focus detection means respectively.

BRIEF DESCRIPTION OF THE DRAWINGS

FIGS. 4A and 4B are flow charts showing an operation of a CPU in a photographic subject position predicting section of a first embodiment.

DESCRIPTION OF THE PREFERRED EMBODIMENTS

First Embodiment

A first embodiment of an auto-focusing device for a camera according to the present invention will now be explained with reference to FIGS. 1 through 6.

Figure 1:
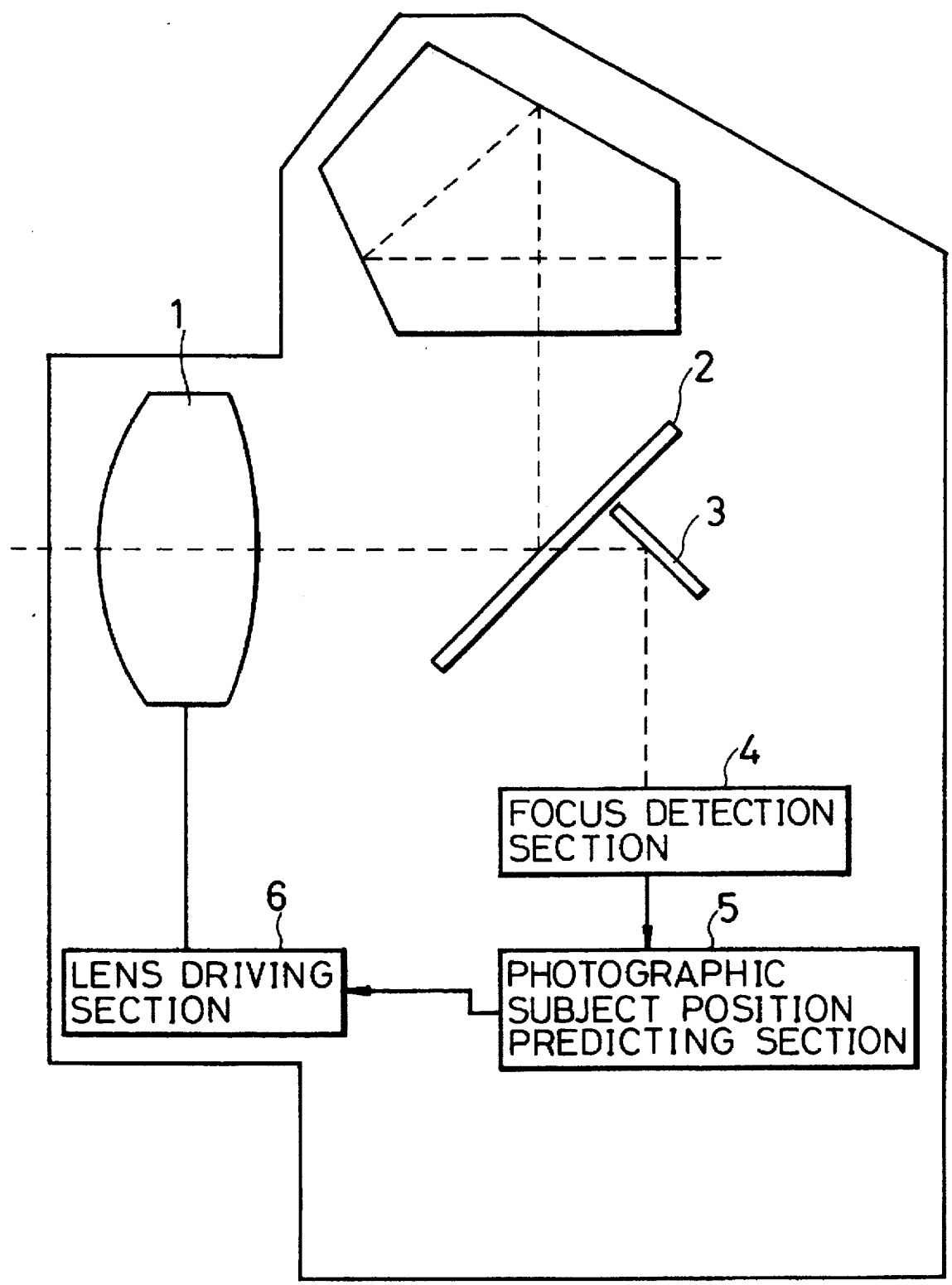
FIG. 1 is an outline configuration diagram of embodiments for an auto-focusing device for a camera according to the present invention.

FIG. 1 is an outline configuration diagram of embodiments for an auto-focusing device for a camera according to the present invention. In FIG. 1, the reference numeral 1 denotes a photographic lens, the reference numeral 2 denotes a quick return mirror that reflects and transmits a light flux from a photographic subject through the photographic lens 1, the reference numeral 3 denotes a sub-mirror that reflects a part of the light flux from the photographic subject that is transmitted through the quick return mirror 2, and the reference numeral 4 denotes a focus detection section that takes in the light flux from the photographic subject that is reflected on the sub-mirror 3 and calculates focus detection information. The focus detection section 4 comprises a known focus detection optical system, an image sensor and an focus detection arithmetic section, and calculates a defocusing amount that is a relative difference amount between a plane where the light flux from the photographic subject forms an image and a conjugate plane of a film.

The reference numeral 5 denotes a photographic subject position predicting section that predicts a future position of the photographic subject based on the defocusing amount calculated by the focus detection section 4, and the photographic subject position predicting section comprises a CPU and peripheral circuits. The reference numeral 6 denotes a lens driving section that drives the photographic lens 1 to a focusing position based on the position predicted by the photographic subject position predicting section 5.

Figure 2:
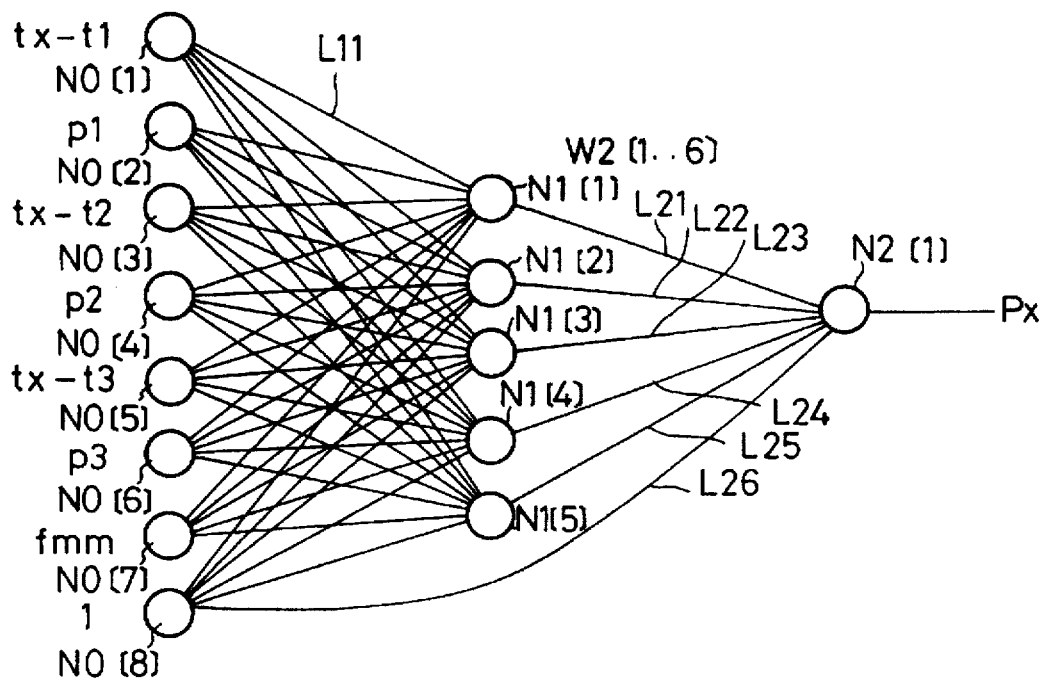
FIG. 2 is a figure showing a configuration of a neural network of a first embodiment.

FIG. 2 is a figure that explains a configuration of a neural network used in this embodiment. This neural network is called as a hierarchical network. The neural network comprises a plurality of neurons (units) shown by circles in Figure. Each of neurons is classified into one of three layers that are an input layer, an intermediate layer and an output layer. Neurons in each of layers are reticulately connected in a direction from the input layer to the intermediate layer and from the intermediate layer to the output layer, and constitute a network. Paths between neurons have specific weight factors, respectively, and a connection degree of the network is determined with a value of each of neurons and a value of weight factor of each of paths.

Many data of moving photographic subjects are collected, and then the weight factors are calculated in advance based on the collected result by using a public known learning method such as the Error Back Propagation Method by Rumelhart et al.(1986) or the like, in a computer, and then the calculated result is stored into a ROM or the like in a camera. In FIG. 2, weight factors of paths that are connected to a neuron N0[1] are labelled with W1[1,1] through W1[1, 5] in order from the upper side, and weight factors of paths that are connected to a neuron N0[2] are labelled with W1[2,1] through w1[2,5]. In the same manner, weight factors of paths that are connected to neurons N0[3] through N0[8] are labelled with W1[3,1] through w1[8,5], respectively.

In FIG. 2, weight factors of paths that are connected between each of neurons N1[1] through N1[5] in the intermediate layer and a neuron N2[1] of the output layer are labelled with W2[1] through W2[5] in order from the upper side, respectively, and a weight factor of a path L26 that is connected between a neuron N0[8] in the input layer and the neuron N2[1] in the output layer is labelled with W2[6].

The input layer comprises eight neurons N0[1] through N0[8]. Past three focus detection results p1 through p3 are inputted to the neurons N0[2], N0[4] and N0[6], respectively. And time differences tx–t1, tx–t2 and tx–t3 between a predicting time when the position of the photographic subject is predicted and each of times when past three focus detections were performed are inputted to the neurons N0[1], N0[3] and N0[5], respectively. A focal length f of the photographic lens 1 is inputted to the neuron N0[7] and a constant "1" is input into the neuron N0[8].

Figure 3:
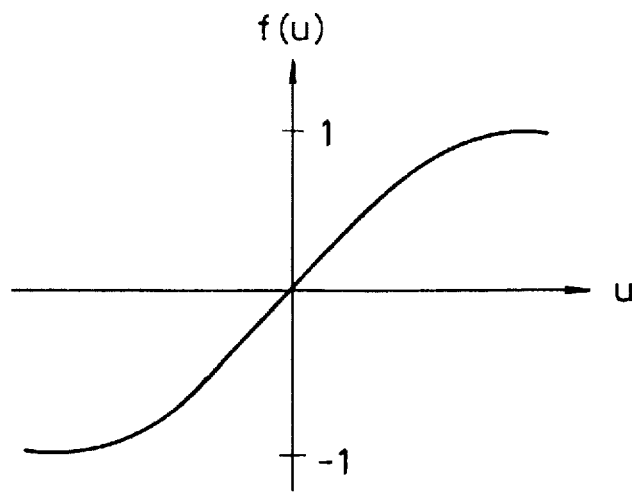
FIG. 3 is a figure showing an example of an input/output function f(u) of a first embodiment.

The intermediate layer comprises five neurons N1[1] through N1[5]. Values of neurons N0[1] through N0[8] are weighted with predefined weight factors W1s. And an input/output function f(u) transforms the weighted results into values of neurons N1[1] through N1[5]. FIG. 3 shows an example of the input/output function f(u) and it is called as a sigmoid function. Its value varies between −1 and +1 continuously.

For example, the neuron N0[1] is weighted into W1[1,1] ·N0[1] after passing a path L11. A value of the neuron N1[1] is determined with neurons N0[1] through N0[8] and weight factors W1[1,1] through W1[8,1] as shown by an expression (1).

$$N1[1] = f\left( \sum_{i=1}^{8} W1[i,1] \cdot N0[i] \right) \quad (1)$$

Values of other neurons in the intermediate layer can be obtained in the same way. As a result, values of neuron N1[n] (n=1 ... 5) is shown by an expression (2).

$$N1[n] = f\left( \sum_{i=1}^{8} W1[i,n] \cdot N0[i] \right) \quad (2)$$

Figure 4A:
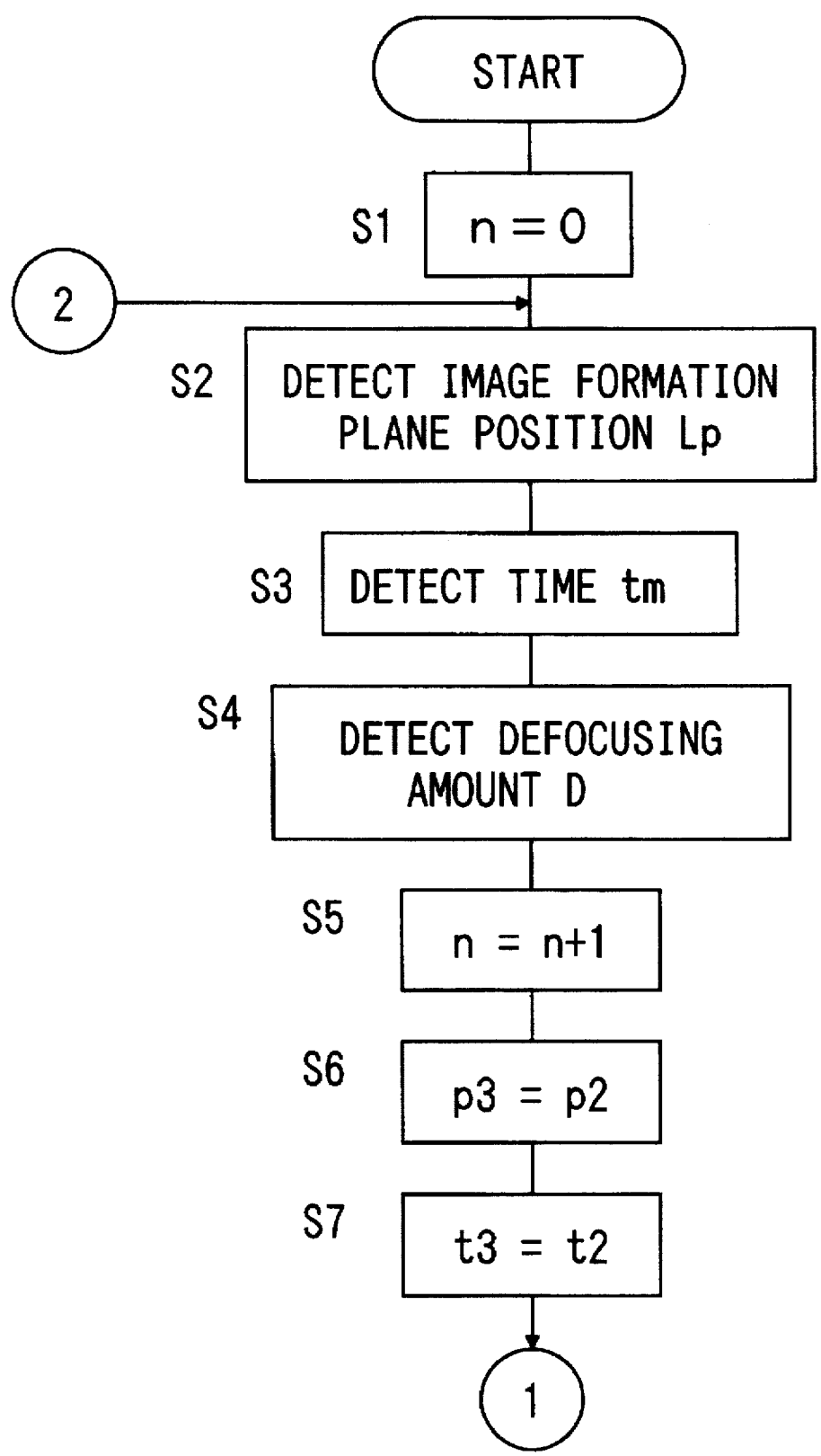

FIGS. 4A and 4B are flow charts showing an operation of the CPU (not shown in Figure) in the photographic subject position predicting section. The CPU starts the operation of FIGS. 4A and 4B by depressing a release button (not shown in Figure) halfway or the like. In these flow charts, a position to be driven 100 ms later is predicted.

In the step S1 of FIG. 4A, a variable n that shows a number of times of focus detection is initialized with "0". In the step S2, an image formation plane position Lp of the light flux from the photographic subject on a current photographic lens position is detected. In the step S3, a current time tm is detected by using a timer or the like. In the step S4, a focus detection calculation is performed according to a predefined algorithm based on a brightness signal of the photographic subject and calculates the defocusing amount D. The image formation plane position np detected in the step S2 added to the defocusing amount D calculated in the step S4 can obtain a true focus adjusting position of the photographic lens 1 (hereinafter called as a focusing position of a photographic lens).

In the step S5, the variable n is added by "1". In the step S6, a value of the variable p2 is putted into the variable p3. As a result, the variable p3 is always a focusing position of the photographic lens 1 on the position of the photographic subject of three times before.

In the step S7, a value of the variable t2 is putted into the variable t3. In the step S8, a value of the variable p1 is putted into the variable p2. In the step S9, a value of the variable t1 is putted into the variable t2. In the step S10, a result of adding the image formation plane position Lp obtained in the step S2 and the defocusing amount D obtained in the step S4 is putted into the variable p1. In the step S11, a value of the variable tm is putted into the variable t1.

As a result, focusing positions of one time before and two times before are putted into the variables p2 and p1, respectively, and times when focus detections were performed one time before, two times before and three times before are putted into the variables t1, t2 and t3, respectively.

In the step S12, a decision is made as to whether or not the variable n is greater than two. If the decision is NO, the flow of control goes to the step S13, and a driving amount of the photographic lens 1 is calculated based on the defocusing amount D calculated in the step S4 and the photographic lens 1 is driven according to the driving amount and the flow of control returns to the step S2. On the other hand, if the decision is YES in the step S12, the flow of control goes to the step S14, and a value of the variable t1 added to 100 ms is putted into the variable tx. In the step S15, a predicting routine, which will be explained later, is performed and a focusing position of the photographic lens 1 is predicted. In the step S16, the photographic lens 1 is driven based on the result predicted in the step S16 and the flow of control returns to step S2.

Figure 5:
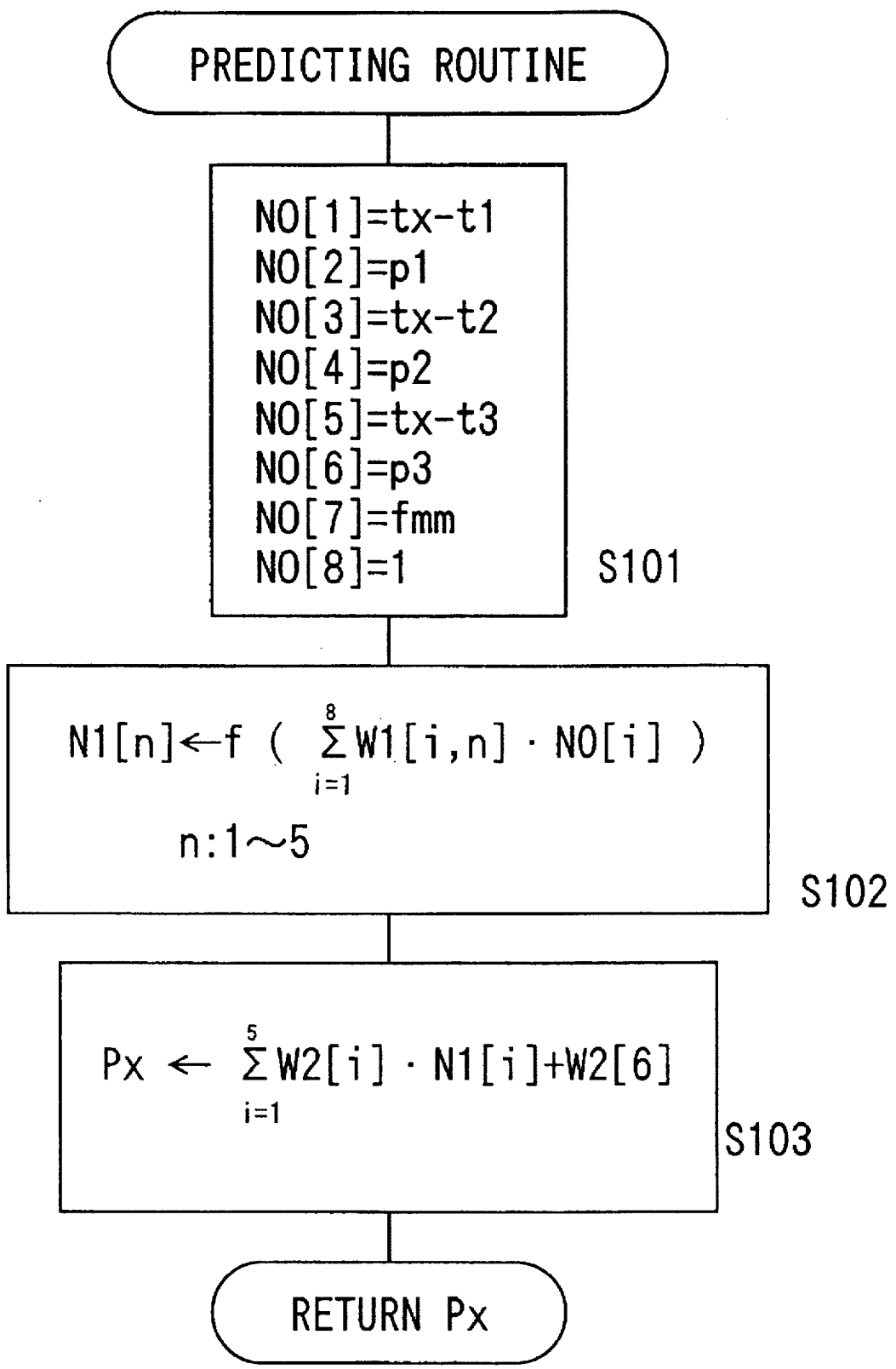
FIG. 5 is a flow chart showing details of a predicting routine of a first embodiment.

FIG. 5 is a flow chart that shows details of the predicting routine of the step S15 in FIG. 4B. In the step S101 of FIG. 5, initial values are putted into the neurons N0[1] through N0[7] in the input layer. The time difference tx–t1 between the predicting time tx when the position of the photographic subject is predicted and the time t1 when a focus detection was performed one time before is putted into the neuron N0[1], and the focusing position p1 of the photographic lens 1 at the time t1 is putted into the neuron N0[2]. The time difference tx–t2 between the predicting time tx and the time t2 when a focus detection is performed two times before is putted into the neuron N0[3], and the focusing position p2 of the photographic lens 1 at the time t2 is putted into the neuron N0[4]. The time difference tx–t3 between the predicting time tx and the time t3 when a focus detection is performed three times before is putted into the neuron N0[5], and the focusing position p3 of the photographic lens 1 at the time t3 is putted into the neuron N0[6]. The focal length f(mm) of the photographic lens 1 is putted into the neuron N0[7] and a constant "1" is putted into the neuron N0[8].

In the step S102, neurons N1[1 through 5] in the intermediate layer are obtained based on the expression (2). In the step S103, the focusing position Px of the photographic lens 1 at the predicting time tx based on an expression (3).

$$Px = \sum_{i=1}^{5} W2[i] \cdot N1[i] + W2[6] \qquad (3)$$

Flow charts of FIGS. 4 and 5 that have been described above will be explained briefly again. First, the focus detection is consecutively performed three times. Times and focusing positions of the photographic lens 1 when the focus detections were performed are putted into the variables t1 through t3 and p1 through p3, respectively. Next, the predicting routine is performed after the predicting time when the position of the photographic subject is predicted is set. In the predicting routine, past three focus detection times and focusing positions of the photographic lens 1 when focus detections were performed and the focal length of the photographic lens 1 are inputted to the neural network as input parameters, and then the focusing position of the photographic lens 1 at the predicting time tx is obtained.

Figure 6:
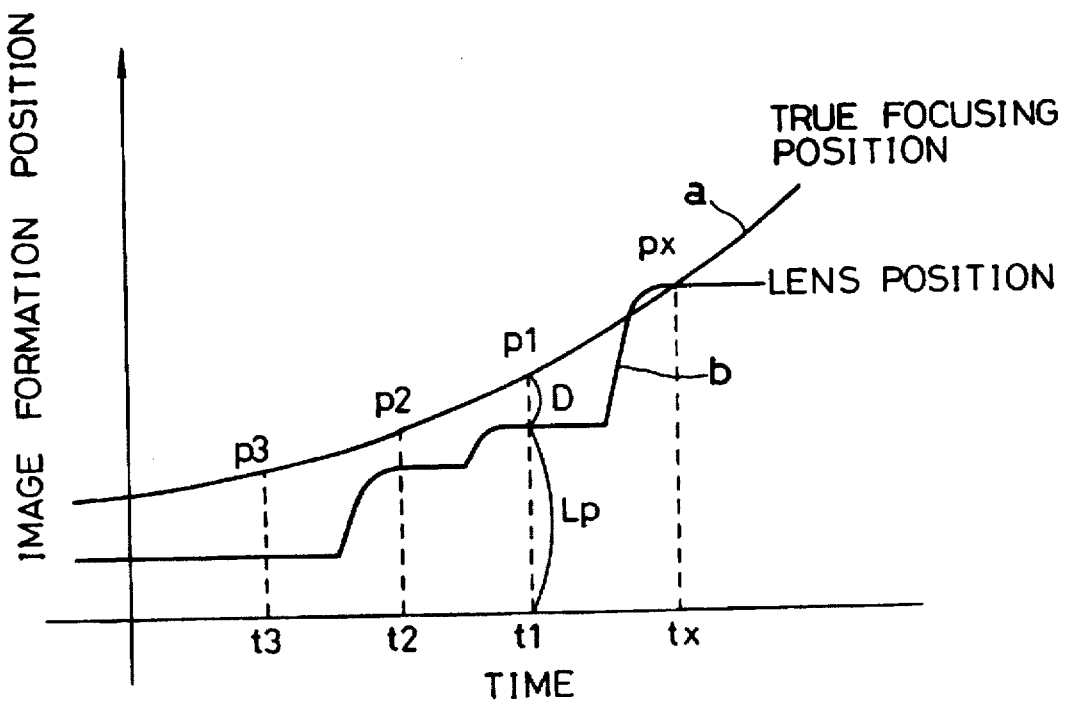
FIG. 6 is a comparison figure between a true focusing position of a photographic lens and a focusing position of a photographic lens predicted in a photographic subject position predicting section of a first embodiment.

FIG. 6 is a comparison figure between a true focusing position (a curve "a") of the photographic lens 1 and a focusing position (a curve "b") of the photographic lens 1 predicted in the photographic subject position predicting section 5 regarding a moving photographic subject. As shown in Figure, the photographic lens 1 is driven at the time t2 according to the true focusing position at the time t3. In the same manner, the photographic lens 1 is driven at the time t1 according to the true focusing position at the time t2. Next, the photographic lens 1 is driven at the time tx when 100 ms has elapsed after time t1 according to the focusing position Px of the photographic lens 1 predicted in the predicting routine shown in Figure. As a result, the photographic lens 1 can be driven almost at the true focusing position. If an exposure is performed at this time tx, a photograph can be always performed in focus.

In the first embodiment, since past three focus detection results and the focal length of the photographic lens 1 are inputted to the neural network and weight factors of paths in the neural network are defined in consideration of various kinds of photographic condition, in this way, the future position of the photographic subject can be predicted accurately by using the neural network. And since times when focus detection information is calculated plural times are inputted to the neural network as input parameters, a moving amount of the photographic subject per time unit is easy to be handled. Further, since the focal length of the photographic lens is inputted as an input parameter, even if a photographer changes the photographic lens, the position of the photographic subject can be predicted accurately in the same way.

Second Embodiment

A second embodiment that will be explained hereinafter can predict a moving speed of a photographic subject as well as a position of the photographic subject by using a neural network. Since this second embodiment is the same as the first embodiment except the neural network and a part of a predicting routine, the neural network and the predicting routine will be mainly explained hereinafter.

Figure 7:
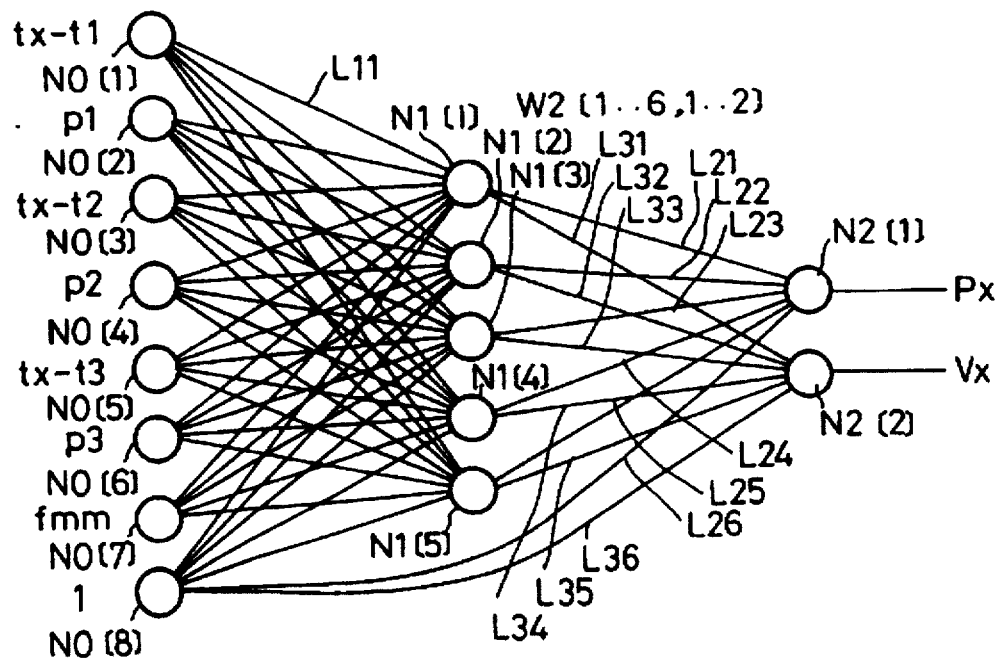
FIG. 7 is a figure showing a configuration of a neural network of a second embodiment.

FIG. 7 is a figure showing a configuration of the neural network of the second embodiment. As shown in Figure, an output layer of the neural network comprises two neurons N2[1] and N2[2]. The neuron N2[1] outputs a predicted focusing position Px of a photographic lens and the neuron N2[2] outputs the predicted moving speed of the photographic subject.

Figure 8:
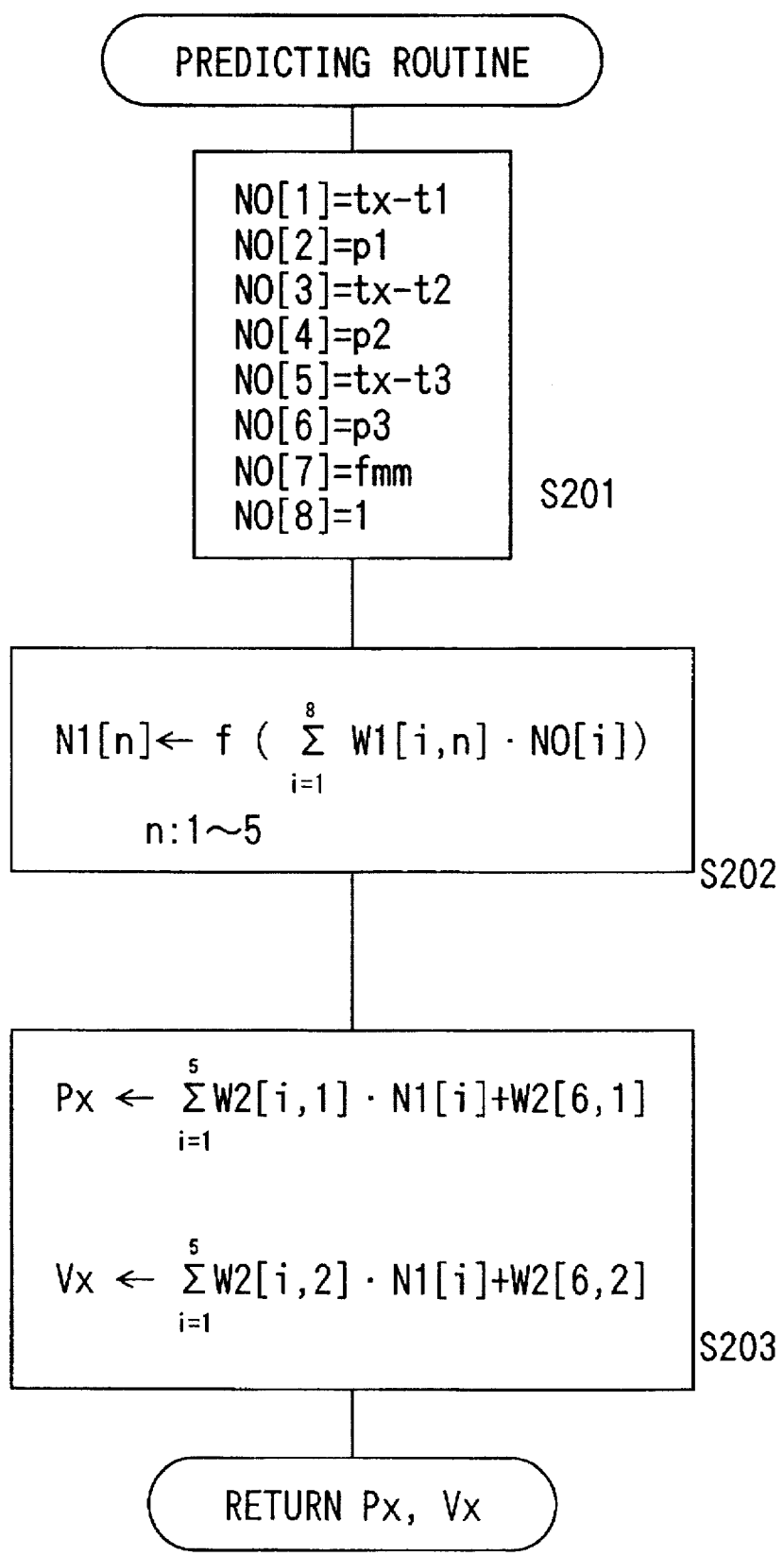
FIG. 8 is a flow chart showing details of a predicting routine of a second embodiment.

FIG. 8 is a flow chart showing details of the predicting routine of the second embodiment. This predicting routine is executed after an operation of the step S14 in FIG. 4B is completed. In the step S201 of FIG. 8, past focus detection results are putted into neurons N0[1] through N0[7] in an input layer, respectively, in the same way as the step 101 of FIG. 5. In the step S202, values of neurons N1[1] through N1[5] in an intermediate layer are determined with neurons N0[1] through N0[8] in the input layer and weight factors W1[1,1] through W1[8,1] of paths, respectively, in the same way as the step S102 of FIG. 5.

Next, in the step S203, the predicted focusing position Px of the photographic subject is obtained in the same way as the step S103 of FIG. 5, and the predicted moving speed Vx of the photographic subject is obtained based on an expression (4).

$$Vx = \sum_{i=1}^{5} W2[i,2] \cdot N1[i] + W2[6,2] \qquad (4)$$

The flow of control goes to the step S16 of FIG. 4B after the predicting routine of FIG. 8 is completed. The photographic lens 1 is driven according to the predicted focusing position Px of the photographic lens and the predicted moving speed Vx that were obtained in the predicting routine.

In this way, since not only the focusing position of the photographic lens 1 is predicted, but also the moving speed of the photographic subject is predicted in the neural network, the more accurate prediction can be performed than the first embodiment. In other words, for example, if the photographic lens is driven based on the predicted position and the predicted moving speed, even if a photography is performed at a little different time from a predicting time tx, the photography is performed in focus.

Third Embodiment

In a third embodiment that will be explained hereinafter, each time a position of a photographic subject is predicted in a neural network, weight factors are corrected based on an error between the predicted position and an actual position and the corrected result is stored into an erasable and programmable nonvolatile memory (not shown in Figure) such as an EEPROM in a camera. This third embodiment is the same as the first embodiment except the erasable and programmable nonvolatile memory that replaces a ROM in the first embodiment where weight factors are stored and a part of a CPU operation changed by adding a learning routine. Consequently, the routine of the CPU operation and the learning routine will be mainly explained hereinafter.

Figure 9A:
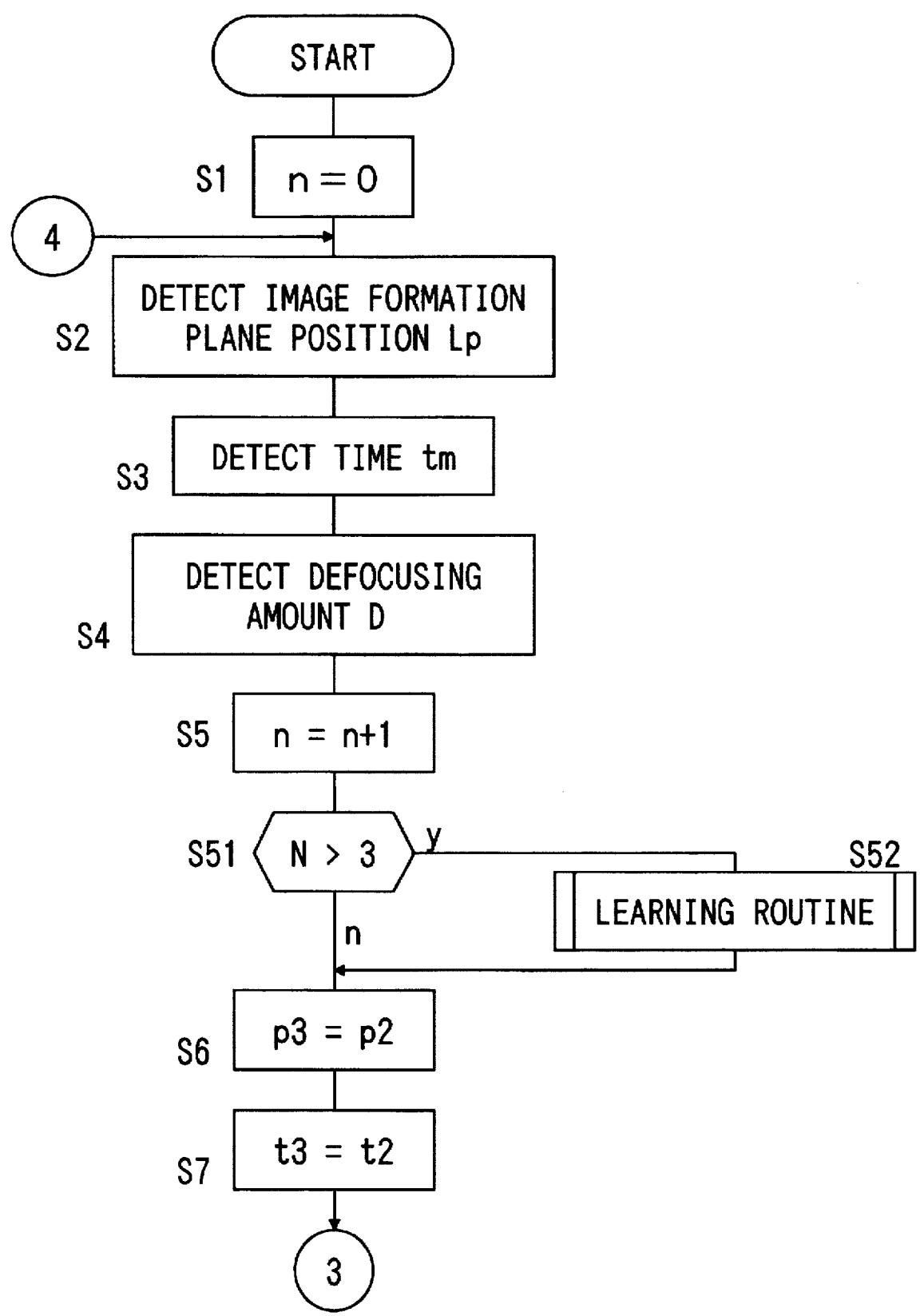
FIGS. 9A and 9B are flow charts showing an operation of a CPU in a photographic subject position predicting section of a third embodiment.
Figure 9B:
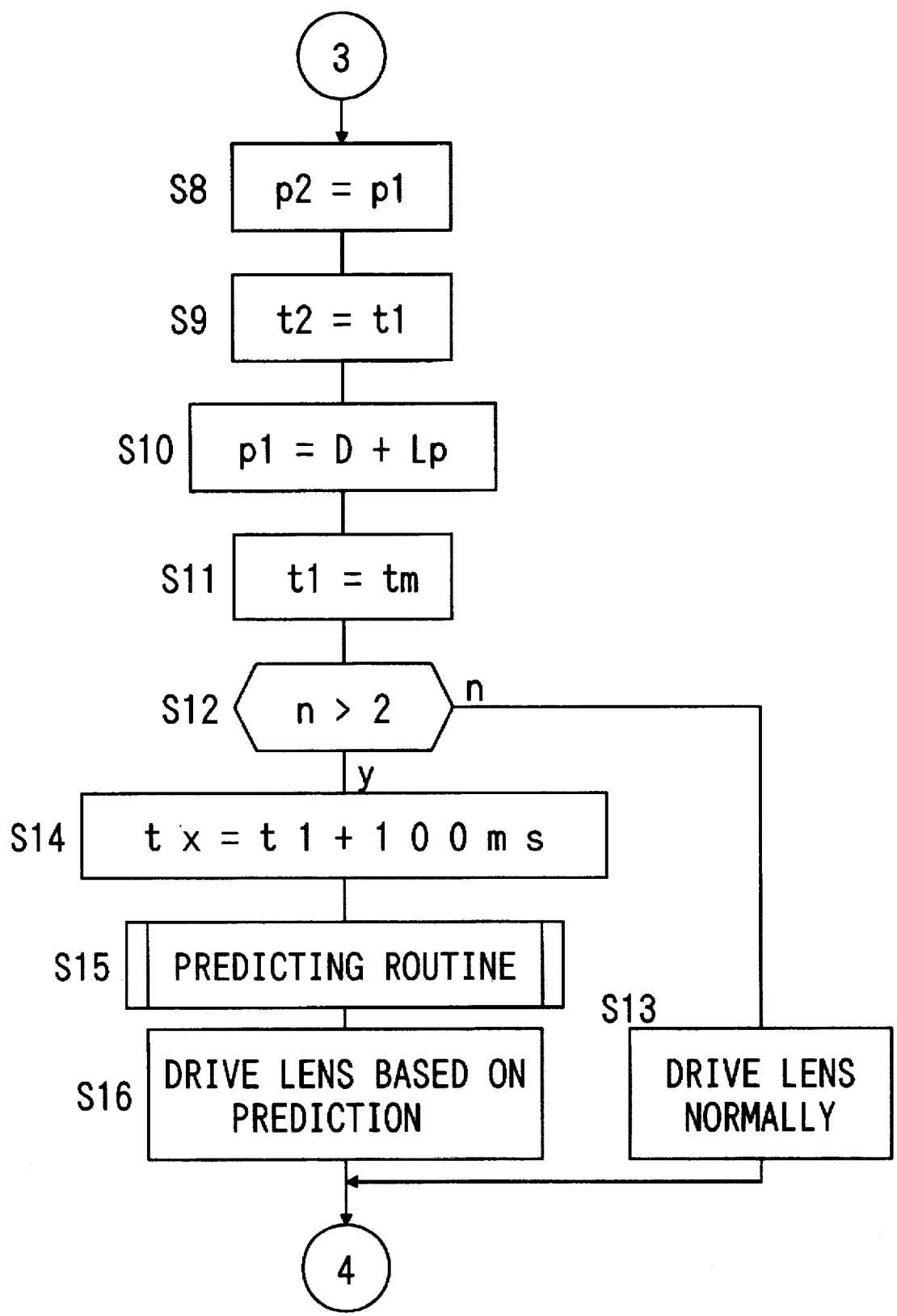

FIGS. 9A and 9B are flow charts showing the operation of the CPU (not shown in Figure) in a photographic subject position predicting section in the same way as FIGS. 4A and 4B. The CPU starts the operation of FIGS. 9A and 9B when a release button (not shown in Figure) is depressed halfway. Since steps until step S5 are the same as the first embodiment, the explanation was described in the first embodiment. Steps S51 and S52 are added to FIG. 4A. The neural network is the same as FIG. 2 of the first embodiment.

In the step S51, a decision is made as to whether or not the variable n is greater than three. If the decision is YES, the flow of control goes to the step S52 and the learning routine that will be explained later is performed. If the decision is NO in the step S51 or the operation of the step S52 is completed, the flow of control goes to the step S6. Steps S6 through S16 are the same as the contents explained in the first embodiment. If a number of focus detection times is more than three, weight factors in the neural network are corrected based on a previous output of the neural network and then a focusing position of a photographic lens is predicted by using the neural network.

Figure 10:
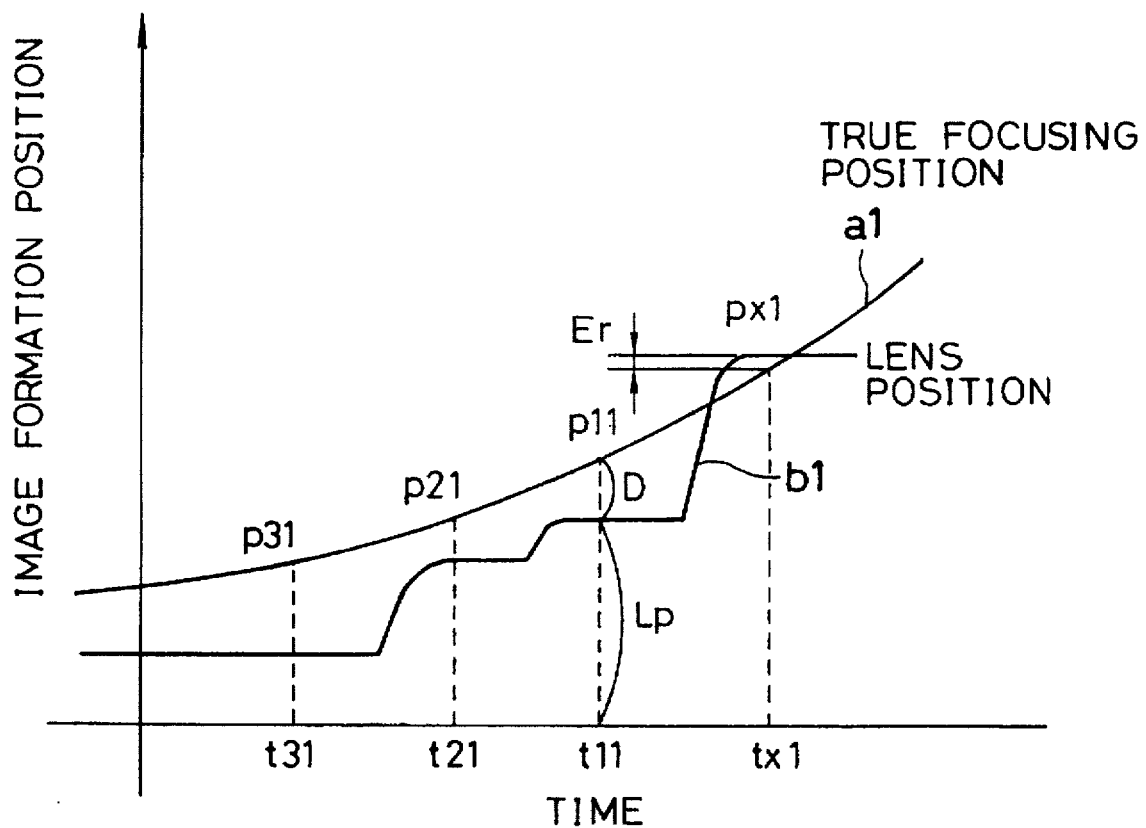
FIG. 10 is a comparison figure between a true focusing position of a photographic lens and a focusing position of a photographic lens predicted in a photographic subject position predicting section of a third embodiment.

FIG. 10 is a comparison figure between a true focusing position (a curve "a1") of the photographic lens 1 and a focusing position (a curve "b1") of the photographic lens 1 predicted in the photographic subject position predicting section 5 regarding a moving photographic subject. As shown in Figure, the photographic lens 1 is driven at time t21 according to the true focusing position at time t31. In the same manner, the photographic lens 1 is driven at time t11 according to the true focusing position at the time t21. Next, the photographic lens 1 is driven at time tx1 when 100 ms has elapsed after the time t11 according to the focusing position Px1 of the photographic lens 1 predicted in a predicting routine. As a result, the photographic lens 1 can be driven almost at the true focusing position. If an exposure is performed at this time tx1, a photograph can be always performed in focus.

However, there is an error Er between the focusing position calculated by the neural network and a conjugate plane of a film as shown at the time tx1 in FIG. 10. This error is corresponding to a defocusing amount D at the time tx1. If the decision is YES in the step S51, that is the focus detection is performed more than three times, the learning routine shown in FIG. 11 is performed and weight factors are corrected according to the error Er.

Figure 11:
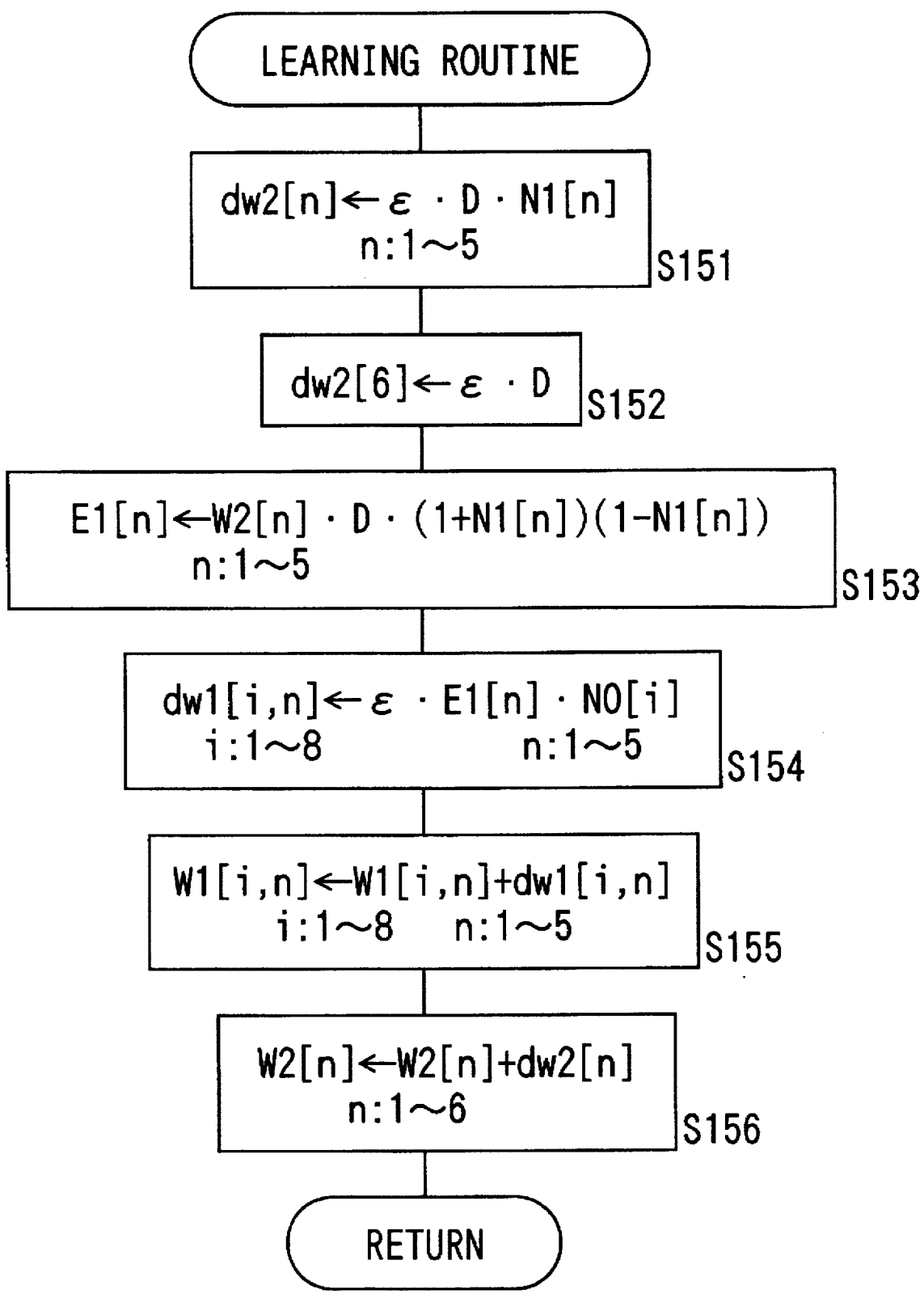
FIG. 11 is a flow chart showing a learning routine of a third embodiment.

FIG. 11 is a flow chart showing details of the learning routine of the step S52 in FIG. 9A. This learning is based on the above-described Error Back Propagation Method. In the step S151 of FIG. 11, correction amounts $dw2[1,1]$ through $dw2[5,1]$ for weight factors W2s of paths L21 through L25 between an intermediate layer and an output layer are calculated based on an expression (5). D denotes a defocusing amount and n denotes an index that distinguishes each of paths. $\epsilon$ denotes a coefficient that defines a size of correction per focus detection, and its value is 0 or from 0 to 1.

$$dw2[n]=\epsilon \cdot D \cdot N1[n] \quad (5)$$

, where n=1 through 5

In the step S152, a correction amount $dw2[6]$ for a weight factor W2 of a path L26 is calculated based on an expression (6).

$$dw2[6]=\epsilon \cdot D \quad (6)$$

In the steps S153 and S154, correction amounts $dw1[1,1]$ through $dw1[8,5]$ for weight factors $W1[1,1]$ through $W1[8,5]$ of paths between an input layer and the intermediate layer are calculated. First, in the step S153, intermediate values $E1[1]$ through $E1[5]$ are obtained based on an expression (7).

$$E1[n]=W2[n] \cdot D \cdot (1+N1[n]) \cdot (1-N1[n]) \quad (7)$$

, where n=1 through 5

Next, in the step S154, correction amounts $dw1[1,1]$ through $dw1[8,5]$ for weight factors W1s are calculated based on an expression (8). In the expression (8), an index i distinguishes each of neurons in the input layer and an index n distinguishes each of neurons in the intermediate layer.

$$dw1[i,n]=\epsilon \cdot E1[n] \cdot N0[i] \quad (8)$$

, where i=1 through 8 and n=1 through 5

In the step S155, weight factors $W1[1,1]$ through $W1[8,5]$ between the input layer and the intermediate layer are corrected based on an expression (9).

$$W1[i,n]=W1[i,n]+dw1[i,n] \quad (9)$$

, where i=1 through 8 and n=1 through 5

In the step S156, weight factors $W2[1]$ through $W2[6]$ between the intermediate layer and the output layer are corrected based on an expression (10) and the flow of control returns.

$$W2[n]=W2[n]+dw2[n] \quad (10)$$

, where n=1 through 6

In this way, in the learning routine, weight factors W2s between the intermediate layer and the output layer are corrected based on the defocusing amount D at the predicted position by the neural network, and weight factors W1s between the input layer and the intermediate layer are corrected based on the defocusing amount D and the weight factors W2s.

In the third embodiment explained above, past three focus detection results and the focal length of the photographic lens 1 are inputted to the neural network and the position of the photographic subject is predicted. Further, weight factors in the neural network are corrected based on the defocusing amount at the position predicted by the neural network. Consequently, the photographic subject that moves complicatedly can be predicted accurately.

Fourth Embodiment

A fourth embodiment that will be explained hereinafter can predict a moving speed of a photographic subject as well as a position of the photographic subject by using a neural network besides the function of the third embodiment. Consequently, each time the position of the photographic subject is predicted in the neural network, weight factors are corrected based on an error between the predicted position and an actual position and an error of the predicted speed, and the corrected result is stored into an erasable and programmable nonvolatile memory (not shown in Figure) such as an EEPROM in a camera.

This fourth embodiment is the same as the third embodiment except a predicting routine and a learning routine changed by adding the prediction of the moving speed. A routine of a CPU operation is the same as the flow charts of FIGS. 9A and 9B in the third embodiment except the predicting routine and the learning routine. The predicting routine is the same as the content changed from the first embodiment to the second embodiment, and the flow chart is the same as the predicting routine of FIG. 8 in the second embodiment. Therefore, the different learning routine will be mainly explained hereinafter.

Figure 12A:
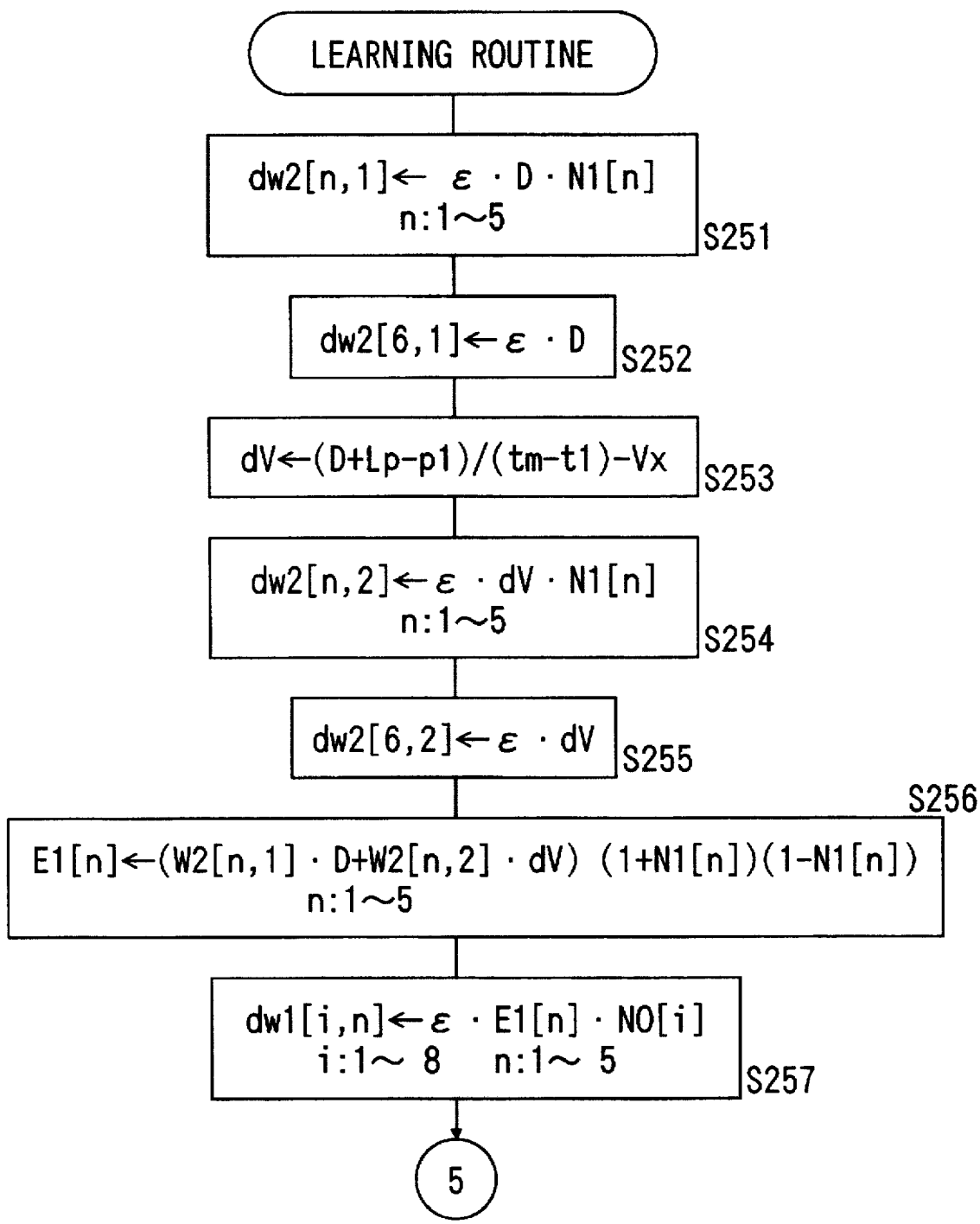
FIGS. 12A and 12B are flow charts showing a learning routine of a fourth embodiment.
Figure 12B:
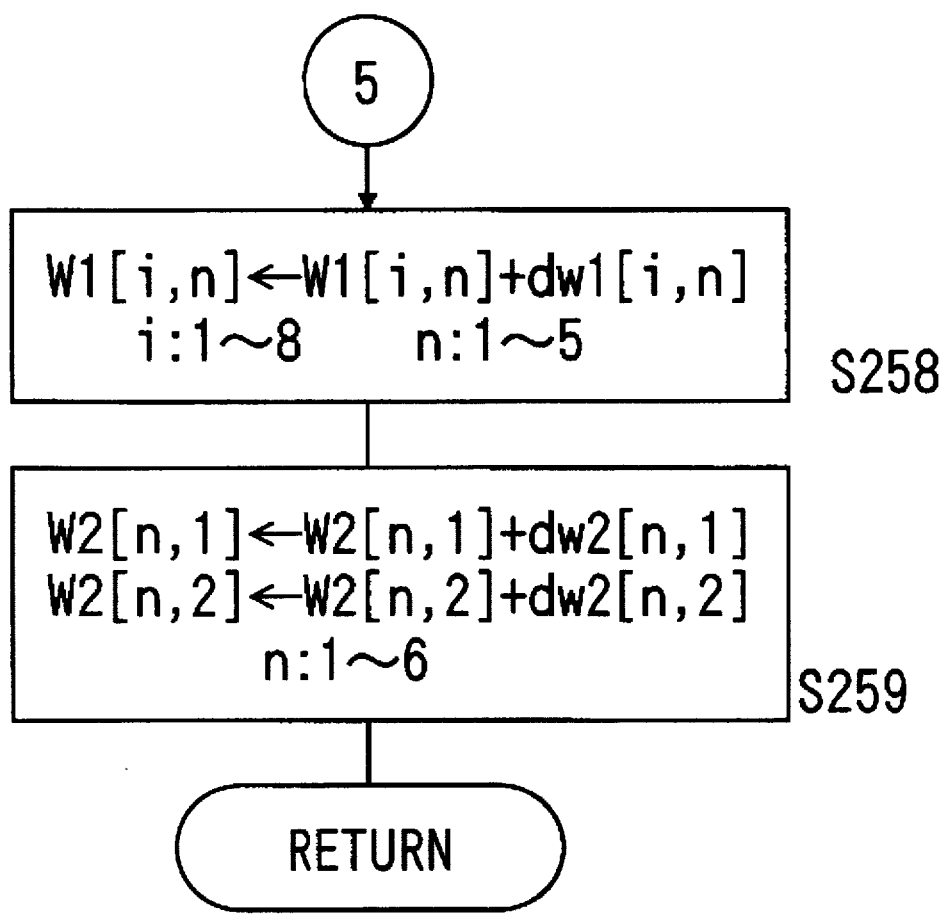

FIGS. 12A and 12B are flow charts showing details of the learning routine of the fourth embodiment. These correspond to the step S52 in the flow chart of FIG. 9A. In the steps S251 and S252 of FIG. 12A, correction amounts $dw2[1,1]$ through $dw2[6,5]$ for weight factors W2s of paths L21 through L25 are calculated in the same way as the steps S151 and S152 of FIG. 11.

In the step S253, a photographic subject moving speed correction amount dV is calculated based on an expression (11).

$$dv = (D + Lp - p1)/(tm - t1) - Vx \quad (11)$$

As shown in the expression (11), a moving speed of the photographic subject is detected based on a focus detection result at time tm and a focus detection result at time t1, and then the moving speed correction amount dV is obtained as a difference between the detected value and a predicted moving speed Vx.

In the step S254, correction amounts dw2[1,2] through dw2[5,2] for weight factors W2s of paths L31 through L35 are calculated based on an expression (12).

$$dw2[n,2] = \epsilon \cdot dV \cdot N1[n] \quad (12)$$

, where n=1 through 5

In the step S255, a correction amount dw2[6,2] for a weight factor W2[6,2] of a path L36 is calculated based on an expression (13).

$$dw2[6,2] = \epsilon \cdot dV \quad (13)$$

In the steps S256 and S257, correction amounts dw1[1,1] through dw1[8,5] for weight factors W1[1,1] through W1[8,5] of paths between an input layer and an intermediate layer are calculated in the same way as the steps S153 and S154. First, in the step S256, intermediate values E1[1] through E1[5] are obtained based on an expression (14).

$$E1[n] = (W2[n,1] \cdot D + W2[n,2] \cdot dV) \cdot (1 + N1[n]) \cdot (1 - N1[n]) \quad (14)$$

, wherein n=1 through 5

Next, in the step S257, correction amounts dw1[1,1] through dw1[8,5] for weight factors W1s are calculated based on an expression (15). In the expression (15), an index i distinguishes each of neurons in the input layer and an index n distinguishes each of neurons in the intermediate layer.

$$dw1[i,n] = \epsilon \cdot E1[n] \cdot N0[i] \quad (15)$$

, where i=1 through 8 and n=1 through 5

In the step S258, weight factors W1[1,1] through W1[8,5] between the input layer and the intermediate layer are corrected based on an expression (16).

$$w1[i,n] = w1[i,n] + dw1[i,n] \quad (16)$$

, where i=1 through 8 and n=1 through 5

In the step S259, weight factors W2[1,1] through W2[6,2] between the intermediate layer and an output layer are corrected based on an expressions (17) and (18), and the flow of control returns.

$$W2[n,1] = W2[n,1] + dw2[n,1] \quad (17)$$

$$W2[n,2] = W2[n,2] + dw2[n,2] \quad (18)$$

, where n=1 through 6

In this way, in the learning routine according to this embodiment, weight factors of paths L21 through L26 between the intermediate layer and the output layer are corrected based on the defocusing amount D, and other weight factors are corrected based on the defocusing amount D and a difference between the moving speed predicted by the neural network and the detected moving speed.

In the fourth embodiment explained above, the focusing position of the photographic lens 1 is predicted by the neural network, and also the moving speed of the photographic subject is predicted. Further, weight factors of paths in the neural network are corrected based on the predicted focusing position of the photographic lens and the predicted moving speed of the photographic subject. Consequently, the photographic subject that moves complicatedly can be predicted more accurately.

In the above-described four embodiments, past three focus detection results, the focal length of the photographic lens 1, and the constant "1" are inputted to the input layer of the neural network. However, the input parameters are not limited to these parameters. It is acceptable that past four focus detection results or more are inputted. On the contrary, it is acceptable that the focal length of the photographic lens 1 is not inputted. It is also acceptable that the constant value that is not "1" is inputted. In the above-described embodiments, pieces of position information p1 through p3 as focus detection results and pieces of time information tx–t1 through tx–t3 are inputted. However, if the focus detection is performed per specified time period, the time information does not need to be inputted.

A number of layers of the neural network is not limited to three layers. More layers are acceptable. In each of the above-described embodiments, the hierarchical neural network is used. However, the structure of the neural network is not limited to the structure in each of the embodiments.

I claim:

1. An auto-focusing device for a camera comprising:

a focus detection section for detecting focus detection information data related to a distance between said camera and a photographic subject a plurality of times at predefined intervals, said distance changing according to movement of the photographic subject;

a photographic subject position predicting section for predicting a future position of said photographic subject based on said plurality of focus detection information data detected said focus detection section; and a lens driving section for driving a photographic lens based on a predicted result of said photographic subject position predicting section, wherein said photographic subject position predicting section includes a neural network that predicts said future position of said photographic subject with an input parameter that has values regarding focusing positions of said photographic lens corresponding to said plurality of said focus detection information data detected by said focus detection section respectively, said plurality of times when said plurality of said focus detection information data are detected respectively, and a prediction time being a time when said future position of said photographic subject is to be predicted, wherein said photographic subject position predictinq section compensates for variable photographic subject speed.

2. An auto-focusing device for a camera according to claim 1, wherein said input parameter has values regarding focusing positions of said photographic lens corresponding to said plurality of said focus detection information data detected by said focus detection section respectively, said plurality of times when said plurality of said focus detection information data are detected respectively, said prediction time, and a focal length of said photographic lens.

3. An auto-focusing device for a camera according to claim 1, wherein said neural network has a plurality of neurons that are classified into three or more layers, said neurons that belong to each of said layers are connected to said neurons that belong to other said layers with paths that are weighted in consideration of various kinds of photographic condition, and a value of each of said neurons is determined with said input parameter and said weighted paths.

4. An auto-focusing device for a camera according to claim 2, wherein said neural network has a plurality of neurons that are classified into three or more layers, said neurons that belong to each of said layers are connected to said neurons that belong to other said layers with paths that are weighted in consideration of various kinds of photographic condition, and a value of each of said neurons is determined with said input parameter and said weighted paths.

5. An auto-focusing device for a camera comprising:

a focus detection section for detecting focus detection information data related to a distance between said camera and a photographic subject a plurality of times at predefined intervals, said distance changing according to movement of the photographic subject;

a photographic subject position predicting section for predicting a future position of said photographic subject based on said plurality of focus detection information data; and a lens driving section for driving a photographic lens based on a predicted result of said photographic subject position predicting section, wherein said photographic subject position predicting section includes a neural network that predicts said future position and a future moving speed of said photographic subject with an input parameter that has values regarding focusing positions of said photographic lens corresponding to said plurality of said focus detection information data detected by said focus detection section respectively, said plurality of times when said plurality of said focus detection information data are detected respectively, and a prediction time being a time when said future moving speed of said photographic subject is to be predicted.

6. An auto-focusing device for a camera according to claim 5, wherein said input parameter has values regarding focusing positions of said photographic lens corresponding to said plurality of said focus detection information data detected by said focus detection section respectively, said plurality of times when said plurality of said focus detection information data are detected respectively, said prediction time, and a focal length of said photographic lens.

7. An auto-focusing device for a camera according to claim 5, wherein said neural network has a plurality of neurons that are classified into three or more layers, said neurons that belong to each of said layers are connected to said neurons that belong to other said layers with paths that are weighted in consideration of various kinds of photographic condition, and a value of each of said neurons is determined with said input parameter and said weighted paths.

8. An auto-focusing device for a camera according to claim 6, wherein said neural network has a plurality of neurons that are classified into three or more layers, said neurons that belong to each of said layers are connected to said neurons that belong to other said layers with paths that are weighted in consideration of various kinds of photographic condition, and a value of each of said neurons is determined with said input parameter and said weighted paths.

9. An auto-focusing device for a camera comprising:

a focus detection section for detecting focus detection information data related to a distance between said camera and a photographic subject a plurality of times at predefined intervals, said distance changing according to movement of the photographic subject;

a photographic subject position predicting section for predicting a future position of said photographic subject based on said plurality of focus detection information data; and a lens driving section for driving a photographic lens based on a predicted result of said photographic subject position predicting section, wherein said photographic subject position predicting section includes a neural network that can learn by a self-organization and predicts said future position of said photographic subject with an input parameter that has values regarding focusing positions of said photographic lens corresponding to said plurality of said focus detection information data detected by said focus detection section respectively, said plurality of times when said plurality of said focus detection information data are detected respectively, and a prediction time being a time when said future position of said photographic subject is to be predicted, and said neural network includes a weight factor correcting section for correcting a predefined weight factor, which indicates a connection degree between said neurons in said neural network, based on an error between a focusing position of said photographic lens corresponding to said position of said photographic subject predicted by said neural network and said focusing position of said photographic lens corresponding to said focus detection information data detected by said focus detection section at said prediction time.

10. An auto-focusing device for a camera according to claim 9, wherein said input parameter has values regarding focusing positions of said photographic lens corresponding to said plurality of said focus detection information data detected by said focus detection section respectively, said plurality of times when said plurality of said focus detection information data are detected respectively, said prediction time, and a focal length of said photographic lens.

11. An auto-focusing device for a camera according to claim 9, wherein said neural network has a plurality of neurons that are classified into three or more layers, said neurons that belong to each of said layers are connected to said neurons that belong to other said layers with paths that are weighted with said weight factors, which are determined in consideration of various kinds of photographic condition and corrected by said weight factor correction section, and a value of each of said neurons is determined with said input parameter and said weighted paths.

12. An auto-focusing device for a camera according to claim 10, wherein said neural network has a plurality of neurons that are classified into three or more layers, said neurons that belong to each of said layers are connected to said neurons that belong to other said layers with paths that are weighted with said weight factors, which are determined in consideration of various kinds of photographic condition and corrected by said weight factor correction section, and a value of each of said neurons is determined with said input parameter and said weighted paths.

13. An auto-focusing device for a camera comprising:

a focus detection section for detecting focus detection information data related to a distance between said camera and a photographic subject a plurality of times at predefined intervals, said distance changing according to movement of the photographic subject;

a photographic subject position predicting section for predicting a future position of said photographic subject based on said plurality of focus detection information data; and a lens driving section for driving a photographic lens based on a predicted result of said photographic subject position predicting section, wherein said photographic subject position predicting section includes a neural network that can learn by a self-organization and predicts said future position and a moving speed of said photographic subject with an input parameter that has values regarding focusing positions of said photographic lens corresponding to said plurality of said focus detection information data detected by said focus detection section respectively, said plurality of times when said plurality of said focus detection information data are detected respectively, and a prediction time being a time when said future position of said photographic subject is to be predicted, and a photographic subject moving speed calculation section for calculating a moving speed of said photographic subject, and said neural network includes a weight factor correction section for correcting a predefined weight factor, which indicates a connection degree between said neurons in said neural network, based on an error between a focusing position of said photographic lens corresponding to said position of said photographic subject predicted by said neural network and said focusing position of said photographic lens corresponding to said focus detection information data detected by said focus detection section at said prediction time and an error between a moving speed of said photographic subject predicted by said neural network and a moving speed of said photographic subject calculated by said photographic subject moving speed calculation section at said prediction time.

14. An auto-focusing device for a camera according to claim 13, wherein said input parameter has values regarding focusing positions of said photographic lens corresponding to said plurality of said focus detection information data detected by said focus detection section respectively, said plurality of times when said plurality of said focus detection information data are detected respectively, said prediction time, and a focal length of said photographic lens.

15. An auto-focusing device for a camera according to claim 13, wherein said neural network has a plurality of neurons that are classified into three or more layers, said neurons that belong to each of said layers are connected to said neurons that belong to other said layers with paths that are weighted with said weight factors, which are determined in consideration of various kinds of photographic condition and corrected by said weight factor correction section, and a value of each of said neurons is determined with said input parameter and said weighted paths.

16. An auto-focusing device for a camera according to claim 14, wherein said neural network has a plurality of neurons that are classified into three or more layers, said neurons that belong to each of said layers are connected to said neurons that belong to other said layers with paths that are weighted with said weight factors, which are determined in consideration of various kinds of photographic condition and corrected by said weight factor correction section, and a value of each of said neurons is determined with said input parameter and said weighted paths.

17. A method of auto-focusing for a camera comprising the steps of:

detecting a plurality of focus detection information data related to a distance between said camera and a photographic subject a plurality of times at predefined intervals, said distance changing according to a movement of said photographic subject;

inputting an input parameter that has values regarding focusing positions of a photographic lens corresponding to said plurality of detected focus detection information data respectively, said plurality of times when said plurality of said focus detection information data are detected respectively, and a prediction time being a time when a future position of said photographic subject is to be predicted, into a neural network;

predicting said future position of said photographic subject in said neural network, wherein said predicting step compensates for variable photographic subject speed; and driving said photographic lens based on a predicted result.

18. A method of auto-focusing for a camera comprising the steps of:

detecting a plurality of focus detection information data corresponding to a distance between said camera and a photographic subject a plurality of times at predefined intervals, said distance changing according to movement of the photographic subject;

inputting an input parameter that has values regarding focusing positions of a photographic lens corresponding to said plurality of detected focus detection information data respectively, said plurality of times when said plurality of said focus detection information data are detected respectively, and a prediction time being a time when a future position of said photographic subject is to be predicted, into a neural network;

predicting said future position and a future moving speed of said photographic subject in said neural network; and driving said photographic lens based on a predicted result.

19. A method of auto-focusing for a camera comprising the steps of:

detecting a plurality of focus detection information data corresponding to a distance between said camera and a photographic subject a plurality of times at predefined intervals, said distance changing according to movement of the photographic subject;

inputting an input parameter that has values regarding focusing positions of a photographic lens corresponding to said plurality of detected focus detection information data respectively, said plurality of times when said plurality of said focus detection information data are detected respectively, and a prediction time being a time when a future position of said photographic subject is to be predicted, into a neural network that can learn by a self-organization;

predicting said future position of said photographic subject in said neural network;

driving said photographic lens based on a predicted results; and correcting a predefined weight factor, which indicates a connection degree between neurons in said neural network, based on an error between a focusing position of said photographic lens corresponding to said predicted position of said photographic subject and a focusing position of said photographic lens corresponding to said detected focus detection information data at said prediction time.

20. A method of auto-focusing for a camera comprising the steps of:

detecting a plurality of focus detection information data corresponding to a distance between said camera and a photographic subject a plurality of times at predefined intervals, said distance changing according to movement of the photographic subject;

inputting an input parameter that has values regarding focusing positions of a photographic lens corresponding to said plurality of detected focus detection information data respectively, said plurality of times when said plurality of said focus detection information data are detected respectively, and a prediction time being a time when a future position of said photographic subject is to be predicted, into a neural network that can learn by a self-organization;

predicting said future position and a future moving speed of said photographic subject in said neural network;

driving said photographic lens based on a predicted result;

calculating a moving speed of said photographic subject based on said detected focus detection information data; and correcting a predefined weight factor, which indicates a connection degree between neurons in said neural network, based on an error between a focusing position of said photographic lens corresponding to said predicted position of said photographic subject and a focusing position of said photographic lens corresponding to said detected focus detection information data at said prediction time and an error between a predicted moving speed of said photographic subject and a calculated moving speed of said photographic subject at said prediction time.

* * * * *